United States Patent [19]
Beckner

[11] 3,775,878
[45] Dec. 4, 1973

[54] SNOW REMOVAL ATTACHMENT DEVICE FOR ROTARY-TYPE MOWERS

[76] Inventor: Charles E. Beckner, 2000 W. Custer Pl., Denver, Colo. 80223

[22] Filed: Aug. 23, 1971

[21] Appl. No.: 174,226

Related U.S. Application Data
[63] Continuation of Ser. No. 858,714, Sept. 17, 1969, abandoned.

[52] U.S. Cl. .................. 37/43 L, 37/53, 94/45 A
[51] Int. Cl. .............................................. E01h 5/04
[58] Field of Search ............... 37/43 R, 43 K, 43 L, 37/26, 27, 53; 172/59, 77, 96, 99, 117, 111, 110, 42; 94/45 A

[56] References Cited
UNITED STATES PATENTS

| | | | |
|---|---|---|---|
| 2,277,389 | 11/1942 | Conway | 94/45 A |
| 2,754,733 | 7/1956 | Beyer | 94/45 A |
| 2,871,957 | 2/1959 | Zacharias Jr. | 172/96 |
| 3,130,653 | 4/1964 | Talbott | 94/45 A |
| 3,269,283 | 8/1966 | Grub | 94/45 A |
| 2,689,368 | 9/1954 | Finnell | 15/171 |
| 2,721,438 | 10/1955 | O'Malley | 56/295 |
| 2,991,567 | 7/1961 | Erickson | 37/43 |
| 3,015,929 | 1/1962 | Bright | 56/193 |
| 3,024,545 | 3/1962 | Clark et al. | 37/41 |
| 3,048,869 | 8/1962 | Beatty | 15/79 |
| 3,051,972 | 9/1962 | Lacy | 15/79 |
| 3,103,678 | 9/1963 | Smith | 15/79 |

Primary Examiner—Robert E. Pulfrey
Assistant Examiner—R. E. Suter
Attorney—Reilly & Lewis

[57] ABSTRACT

A snow-removal attachment device for rotary-type mowers has resilient, flap-like wiper members secured in a dependent manner at each end of an elongated support member which in turn mounts on the rotary shaft of the mower motor. Each wiper member extends rearwardly of the direction of rotation of the support member and is inclined at a relatively small angle relative to the ground surface to dispose a trailing end portion of the wiper members in a firm engagement with the ground surfaces over which the mower is moved. One form of the device has the ends of a blade-like support member twisted in opposite directions and another form of the device has the wiper members hingedly supported and is provided with adjustable biasing means to change the angle of inclination of the wiper members and the extent of its contact against the ground surface.

6 Claims, 5 Drawing Figures

PATENTED DEC 4 1973

3,775,878

INVENTOR.
Charles E. Beckner
BY
Reilly and Lewis
ATTORNEYS

SNOW REMOVAL ATTACHMENT DEVICE FOR ROTARY-TYPE MOWERS

This is a continuation of application, Ser. No. 858,714, filed 9-17-69, now abandoned.

This invention relates to a novel and improved attachment device for rotary-type mowers to facilitate snow removal from sidewalks, driveways and the like.

Among the problems attendant to the removal of snow from sidewalks, streets or driveways is that it frequently becomes packed, the contour of the ground surface is irregular and irregular objects such as stones or rocks are present.

Rotary-type lawn mowers for cutting grass afford a lightweight vehicle which is frequently available and is particularly easy to handle and use. Some attempts have been made to provide attachment devices to replace the cutter blade of such rotary-type lawn mowers for the removal of snow. One such device is described in the U.S. Pat. No. 2,984,919 to R. D. Stoddard. This patent describes a snow removal attachment whereby plow elements in the form of rigid scoop members are provided at the outer ends of a support blade. These scoop members incline forwardly in the direction of rotation of the support member to in effect scoop the snow and each scoop member has a narrow band of bristle-like wire elements for ground engagement. Certain advantages are believed provided by the present invention over this prior art device. Accordingly, it is an object of this invention to provide a novel and improved, snow-removal attachment device for rotary-type lawn mowers which is relatively simple, durable and easy to install.

Another object of this invention is to provide a new and improved snow-removal attachment device which is particularly suitable for removing packed snow and is not readily damaged by rocks or materially affected by irregular surface contours.

In accordance with the present invention one of the principal features is the provision of resilient, snow-engaging wiper-type members which are inclined at a shallow angle to the horizontal rearwardly away from the direction of rotation and will flex along its length so that the trailing end portion will in effect wipe against the ground surface and at the same time scrape packed snow and yield when it comes into contact with rocks or an irregular contour. Another feature is the provision of a bias member between the hinged wiper member which will further yieldably urge the wiper member against the surface being cleaned as well as permit adjustment in the angle of inclination as required.

Other objects, advantages and capabilities of the present invention will become more apparent as the description proceeds taken in conjunction with the accompanying drawings in which.

Figure 1:
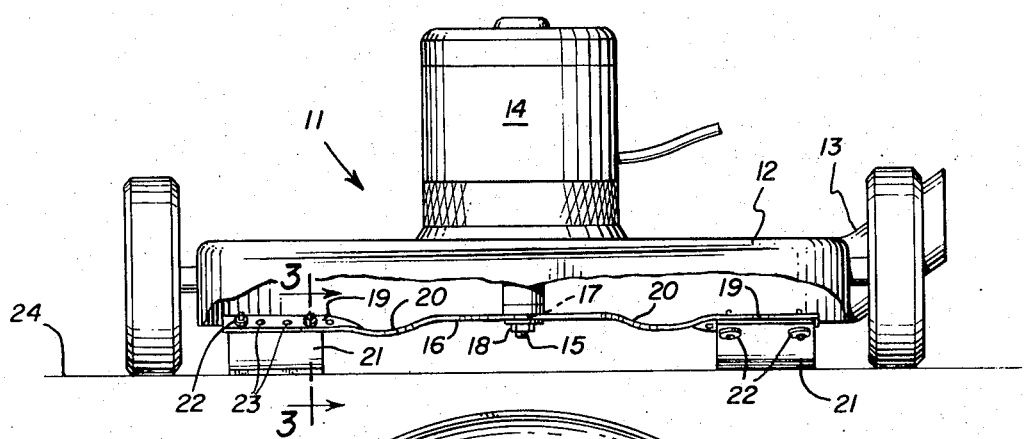
FIG. 1 is an elevational view of a snow-removal attachment device mounted on the motor shaft of a rotary mower with a portion of the cover shown broken away.
Figure 2:
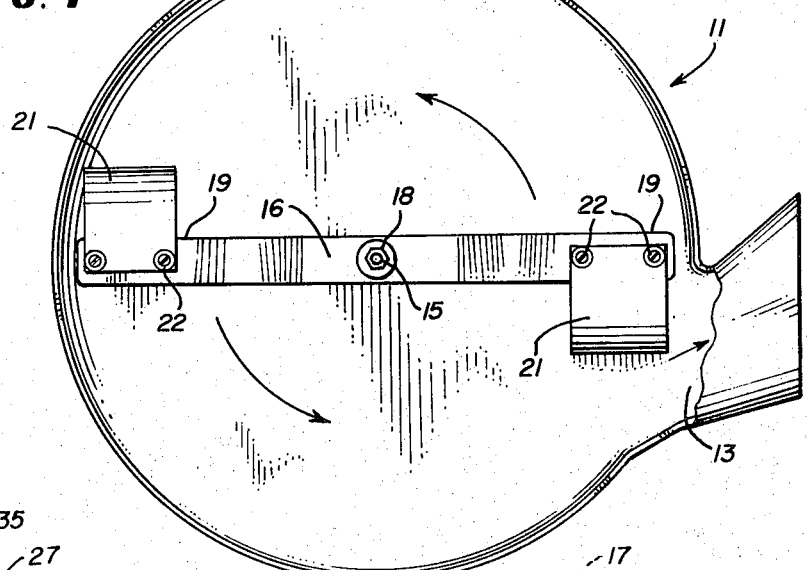
FIG. 2 is a bottom plan view showing the direction of rotation thereof relative to the mower housing.

Referring now to the drawings FIGS. 1 and 2 a rotary lawn mower 11 shown typically comprises a wheeled housing 12 with a side discharge outlet 13 which is adapted to be pushed over the ground surface. A motor 14 is mounted on top of the housing and the depending shaft 15 of the motor is extended into the central part of the housing. The motor is typically a self-propelled electric or gasoline powered unit.

The snow-removal attachment device which mounts on the shaft 15 after its grass cutter blade is removed comprises an elongated blade-like support member 16 in the form of a metal blade or flat sided strip of metal having a central aperture 17 which permits the support member to be detachably mounted on the end of the shaft 15 and is secured thereto by means of a nut 18 as is the usual practice with the mounting of the cutter blade on the mower. The length of the support member 16 will be essentially the same as that of the mower cutter blade so there is a gap between each end thereof and the housing wall and preferably will be provided in standard cutter blade length sizes to mount on conventional rotary lawn mowers.

Figure 3:
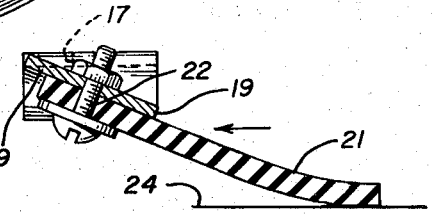
FIG. 3 is a sectional view taken along lines 3—3 of FIG. 1.

The end portions 19 of the support member 16 are twisted in opposite directions relative to its flat central portion as best shown in FIG. 1. An intermediate portion 20 of the support member is bent down or offset from the flat central portion with flat upper and lower faces to lower the twisted end portions 19 relative to the support surface so as to provide a relative shallow acute angle relative to the ground surface. These preferred acute angles of the device shown in above is about 22.5°. As best seen in FIG. 3, the leading edge of the support member is on the left and the trailing edge on the right.

A flap-like wiper or plow member 21 is detachably mounted on each twisted end portion 19 by means of a suitable fastener 22 such as a bolt, nut and washer assembly with the washer being disposed against the outer side of the flap-like wiper member. The end portion of the blade is provided with a series of spaced apertures 23 which permits the flap-like wiper member to be adjusted to different positions lengthwise of the support member.

As best shown in FIG. 3 the twisted end portions dispose the flap-like members at an angle inclined to the horizontal and rearwardly of the direction of rotation of the support member. The flap-like wiper member is made of a resilient material such as reinforced rubber or reinforced neoprene and extends rearwardly to the extent that the trailing end portion is yieldably urged against and wipes against the ground surface 24 as the mower is moved over the ground surface and the support member is rotated. More specifically, each flap-like wiper member has a surface with an upper portion facing forwardly in relation to the direction of movement thereof and extending downwardly and rearwardly away from the leading edge of the support member at an angle, the surface having a lower portion forming a lower curved extension of the upper portion and is urged downwardly against and in wiping engagement with the ground surface as shown. In this way the rotary action of the wiper members serves to move the snow on the ground surface through the side outlet 13 as best shown by arrows in FIG. 2. The combined effect of the shallow angle and the resilience along the lengthwise extent of the wiper member afford a good wiping action and effects a clean snow removal from sidewalks and the like. The resiliency of the wiper members permit them to yield sufficiently to adjust to irregularities in the contour and the structure is sufficiently flexible and durable as not to be materially affected by rocks or the like. In the case of packed snow the urging of the resilient end portion against the snow pack combined with the high speed rotation thereof is effective in scraping and breaking up the packed snow.

Figure 5:
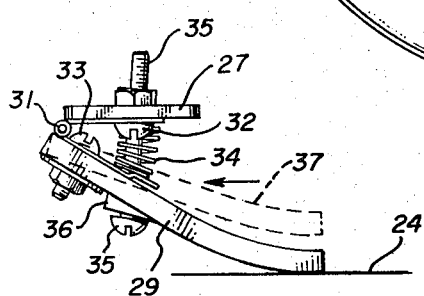
FIG. 5 is an end elevation view of FIG. 4 drawn to an enlarged scale.
Figure 4:
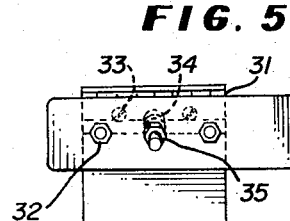
FIG. 4 is a plan view of another form of snow-removal attachment device.

A hinged or pivoted form of snow plow attachment device shown in FIGS. 4 and 5 which is also suitable for attachment to the mower 11 above-described comprises an elongated support member 27 which is essentially a flat bar or rod but is straight throughout its lengthwise extent and is also provided with a central aperture 28 to permit it to be mounted on the shaft of the mower motor. Resilient flap-like wiper members 29 are hingidly mounted in a depending manner on each end of the support means by means of a hinge 31 secured by spaced fasteners 32 such as screw, nut and washer assemblies between the upper hinge arm and the support member and by spaced fasteners 33 such as screw, nut and washer assemblies between the lower hinge arm and the wiper member to provide an arrangement whereby the wiper member will hingidly move or pivot up and down from the forward end or leading end of the support member. As best shown in FIGS. 4 and 5 the intermediate joint section of the hinge shown as being of the piano type is disposed forwardly of the forward end of the support members so that the flat member will pivot through a range of different degrees. In this form each wiper member is held in a desired position and yieldably urged downwardly against the ground surface by means of a biasing spring 34 which is held between the upper forward surface of the flap-like wiper member and the under side of the support arm with an adjustable fastener 35 in the form of a nut and bolt assembly having a triangular-shaped washer 36 bearing against the under side of the wiper member. The general operation of this form is the same as the first form but this construction permits the spacing between the support member and the wiper members to be adjusted to the different angles of inclination by rotating the bolt or turning the screw which will also change the degree of force pressing the wiper member against the earth's surface to accomodate different snow pack conditions.

Although the present invention has been described with a certain degree of particularity, it is understood that the present disclosure has been made by way of example and that changes in details of structure may be made without departing from the spirit thereof.

What is claimed is:

1. In a snow-removal device including a rotary-type lawn mower having a wheeled housing for movement over a surface of operation with a side discharge outlet and a motor mounted on the housing with a depending drive shaft extending into the housing, a snow-removal attachment device removably mounted on the lower end of the drive shaft in the housing, said snow-removal attachment device comprising:

an elongated support bar having a straight intermediate portion and end portions turned at an angle to the intermediate portion, said support bar having a leading edge, the leading edge of the turned portions being above the trailing edge of the turned portions; and a wiper member secured at each turned end portion of the support bar disposed at an angle of inclination to the intermediate portion of the support bar, each wiper member being resilient so as to bend along its length when urged downwardly against and in wiping engagement with the surface of operation to conform to the irregularities in the contour of the surface of operation as the support bar is rotated, each said wiper member having an upper portion extending underneath and supported along the underside of an associated turned end portion of the support bar, the upper end of each said wiper member beginning substantially at the leading edge and extending downwardly and rearwardly away from the leading edge of the support bar and a lower portion forming a lower curved extension of said upper portion when urged downwardly against and in wiping engagement with the surface of operation during rotation thereof whereby to force snow on the surface of operation along the inner walls of the housing and out the side discharge outlet upon the rotation of said shaft and movement of the wheeled housing over the surface of operation.

2. In a snow-removal device as set forth in claim 1 wherein the angle to the intermediate portion for the upper portion of each said wiper member is less than 45°.

3. In a snow-removal device as set forth in claim 1 wherein each said wiper member is in the form of a single integral flap-like body made of a reinforced rubberized material.

4. In a snow-removal device as set forth in claim 1 wherein said support bar is a flat-sided strip of metal with a flat central portion and reversely twisted substantially to the same angular degree at the ends and having the intermediate portion on each side of the central portion and offset from the central portion to dispose each of the wiper members below the intermediate portion.

5. In a snow-removal device including a rotary-type lawn mower having a wheeled housing for movement over a surface of operation with a side discharge outlet and a motor mounted on the housing with a depending drive shaft extending into the housing, a snow-removal attachment device removably mounted on the lower end of the drive shaft in the housing, said snow-removal attachment device comprising:

an elongated support bar having a leading edge with opposed end portions;

a wiper member hingedly secured at its upper forward end to the leading edge of each end portion of the support bar and extending at an angle of inclination to the support bar, each said wiper member being resilient so as to bend along its length when urged downwardly against and in wiping engagement with the surface of operation to conform to the irregularities in the contour of the surface of operation as the support bar is rotated, each said wiper member having an upper portion extending underneath and supported along the underside of an associated end portion of the support bar, the upper end of each said wiper member beginning substantially at the leading edge and extending downwardly and rearwardly away from the leading edge of the support bar and a lower portion forming a lower curved extension of said upper portion when urged downwardly against and in wiping engagement with the surface of operation during rotation thereof;

a biasing member between the underside of the support bar and on the top of each wiper member to urge the wiper members away from the support bar and against the surface of operation whereby to force snow on the surface of operation along the inner walls of the housing and out the side discharge outlet upon the rotation of said shaft and movement of the wheeled housing over the surface of operation.

6. In a snow-removal device as set forth in claim 5 including an adjustable fastening means between each support bar and each wiper member to provide a variation in the angle therebetween and thereby the amount of contact with the surface of operation.

* * * * *